US012687899B2

(12) United States Patent
Shi et al.

(10) Patent No.: US 12,687,899 B2
(45) Date of Patent: Jul. 21, 2026

(54) HINGE MECHANISM AND ELECTRONIC DEVICE

(71) Applicant: Huawei Technologies Co., Ltd., Shenzhen (CN)

(72) Inventors: Tuo Shi, Shanghai (CN); Jiangbo Chen, Hangzhou (CN); Qiang Zhan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 18/820,854

(22) Filed: Aug. 30, 2024

(65) Prior Publication Data

US 2024/0427387 A1     Dec. 26, 2024

Related U.S. Application Data

(63) Continuation of application No. PCT/CN2024/078195, filed on Feb. 22, 2024.

(30) Foreign Application Priority Data

Jun. 26, 2023    (CN) .......................... 202310760804.0

(51) Int. Cl.
    *G06F 1/16* (2006.01)
(52) U.S. Cl.
    CPC .......... *G06F 1/1681* (2013.01); *G06F 1/1652* (2013.01)
(58) Field of Classification Search
    CPC ... G06F 1/1681; G06F 1/1652; H04M 1/0268
    See application file for complete search history.

(56) References Cited

U.S. PATENT DOCUMENTS

2024/0401387 A1* 12/2024 Fan ........................ G06F 1/1681

FOREIGN PATENT DOCUMENTS

| CA | 2864205 | C | 10/2017 |
|----|---------|---|---------|
| CN | 201479061 | U | 5/2010 |
| CN | 104712692 | A | 6/2015 |
| CN | 104832578 | A | 8/2015 |
| CN | 105391270 | A | 3/2016 |
| CN | 205070850 | U | 3/2016 |
| CN | 205584269 | U | 9/2016 |
| CN | 104279221 | B | 12/2016 |
| CN | 205900075 | U | 1/2017 |

(Continued)

*Primary Examiner* — James Wu
(74) *Attorney, Agent, or Firm* — Slater Matsil, LLP

(57) ABSTRACT

The hinge mechanism includes a main shaft, a first rotating piece, a first mounting plate, a first magnetic piece, a first magnetic fitting piece, a second rotating piece, a second mounting plate, a second magnetic piece, and a second magnetic fitting piece. The first rotating piece, the first mounting plate, the second rotating piece, and the second mounting plate are rotatably connected to the main shaft. The first rotating piece is slidably connected to the first mounting plate. The second rotating piece is slidably connected to the second mounting plate. The first magnetic piece is on the first rotating piece. The first magnetic fitting piece is located on the first mounting plate and magnetically attracts the first magnetic piece. The second magnetic piece is on the second rotating piece. The second magnetic fitting piece is on the second mounting plate and magnetically attracts the second magnetic piece.

18 Claims, 8 Drawing Sheets

(56)         References Cited

FOREIGN PATENT DOCUMENTS

| | | | | |
|----|----------------|----|---------|------------------|
| CN | 212624631 U | * | 2/2021 | .......... G06F 1/1681 |
| CN | 114060397 A | | 2/2022 | |
| CN | 115126770 A | | 9/2022 | |
| CN | 217633431 U | | 10/2022 | |
| CN | 116696931 A | | 9/2023 | |
| CN | 117450162 A | | 1/2024 | |
| KR | 20210009574 A | | 1/2021 | |
| WO | 2009155862 A1 | | 12/2009 | |

* cited by examiner

10

13

14

11

12

14

142

B

B

140

141

1422

14221

1421
1427      } 142
1426

1416

1417      } 141

1411

1412

14121

140

HINGE MECHANISM AND ELECTRONIC DEVICE

CROSS-REFERENCE TO RELATED APPLICATIONS

This application is a continuation of International Application No. PCT/CN2024/078195, filed on Feb. 22, 2024, which claims priority to Chinese Patent Application No. 202310760804.0, filed on Jun. 26, 2023. The disclosures of the aforementioned applications are hereby incorporated by reference in their entireties.

TECHNICAL FIELD

This application relates to the field of electronic device technologies, and in particular, to a hinge mechanism and an electronic device.

BACKGROUND

As flexible display technologies gradually become mature, display manners of electronic devices change greatly. A mobile phone with a foldable flexible display, a tablet computer with a foldable flexible display, a wearable electronic device with a foldable flexible display, and the like are an important evolution direction of intelligent electronic devices in the future.

A hinge mechanism, as an important part for implementing a folding function of a foldable electronic device, has a feature of being continuously folded. The hinge mechanism may be configured to change a folding status of the electronic device, and may further provide sufficient support forces for the flexible display of the electronic device in different folding statuses. An existing hinge mechanism includes a main shaft and a damping assembly. When the hinge mechanism is folded, the damping assembly may provide a torque force, so that the hinge mechanism stably rotates. The damping assembly adopts a cam-and-spring structure. The torque force is generated by using a cam that is of a rotating assembly and that is perpendicular to the main shaft and by squeezing a cam surface of the main shaft by a spring. However, a structure of the existing hinge is complex, which is unfavorable to a light and thin design of the foldable electronic device.

SUMMARY

This application provides a hinge mechanism and an electronic device, to generate a magnetic torque force between a rotating piece and a mounting plate by using a magnetic attraction force between a magnetic piece and a magnetic fitting piece. This simplifies a structure of the hinge mechanism and implements a light and thin design of the electronic device.

According to a first aspect, this application provides a hinge mechanism used in a foldable electronic device. Specifically, the hinge mechanism includes a main shaft, a first rotating assembly, and a second rotating assembly. The first rotating assembly and the second rotating assembly are disposed opposite to each other on two sides of the main shaft. The first rotating assembly includes a first rotating piece, a first mounting plate, a first magnetic piece, and a first magnetic fitting piece. The first rotating piece and the first mounting plate may be separately rotatably connected to the main shaft, a rotation axis center of the first rotating piece relative to the main shaft is parallel to and does not overlap a rotation axis center of the first mounting plate relative to the main shaft, and the first rotating piece is slidably connected to the first mounting plate. The first magnetic piece is disposed on the first rotating piece, the first magnetic fitting piece is disposed on the first mounting plate, and the first magnetic piece is configured to magnetically attract and fit the first magnetic fitting piece. Correspondingly, the second rotating assembly includes a second rotating piece, a second mounting plate, a second magnetic piece, and a second magnetic fitting piece. The second rotating piece and the second mounting plate may be separately rotatably connected to the main shaft, a rotation axis center of the second rotating piece relative to the main shaft is parallel to and does not overlap a rotation axis center the second mounting plate relative to the main shaft, and the second rotating piece is slidably connected to the second mounting plate. The second magnetic piece is disposed on the second rotating piece, the second magnetic fitting piece is disposed on the second mounting plate, and the second magnetic piece is configured to magnetically attract and fit the second magnetic fitting piece. When the first mounting plate slides relative to the first rotating piece in a direction away from the main shaft, and the second mounting plate slides relative to the second rotating piece in a direction away from the main shaft, the first magnetic piece and the first magnetic fitting piece get away from each other to provide a first resistance force for relative sliding between the first rotating piece and the first mounting plate, and the second magnetic piece and the second magnetic fitting piece get away from each other, to provide a second resistance force for the second rotating piece and the second mounting plate. When the first mounting plate slides relative to the first rotating piece in a direction close to the main shaft, and the second mounting plate slides relative to the second rotating piece in a direction close to the main shaft, the first magnetic piece and the first magnetic fitting piece come close to each other to drive relative sliding between the first rotating piece and the first mounting plate, and the second magnetic piece and the second magnetic fitting piece come close to each other to drive relative sliding between the second rotating piece and the second mounting plate.

When the hinge mechanism is used in the electronic device, when the electronic device is folded, the first rotating assembly and the second rotating assembly rotate toward each other. In this case, the first rotating piece and the first mounting plate separately rotate around the main shaft, and their rotation axis centers do not overlap. In this way, a phase difference between axis centers of the first rotating piece and the first mounting plate that are disposed on a same side may be implemented in a rotation process of the hinge mechanism. This implements relative sliding motion of the two rotating assemblies, so that the first magnetic piece and the first magnetic fitting piece are separated from an attraction and fitting state, and a magnetic attraction force is generated between the first magnetic piece and the first magnetic fitting piece. The magnetic attraction force may provide the first resistance force for relative sliding between the first rotating piece and the first mounting plate, to implement a damping function. In addition, the second rotating piece and the second mounting plate also separately rotate around the main shaft, and their rotation axis centers do not overlap. In this way, a phase difference between axis centers of the second rotating piece and the second mounting plate that are disposed on a same side may be implemented in a rotation process of the hinge mechanism. This implements relative sliding motion of the two rotating assemblies, so that the second magnetic piece and the second magnetic fitting piece are separated from an attraction and fitting state, and a magnetic attraction force is generated between the second magnetic piece and the second magnetic fitting piece. The magnetic attraction force may provide the second resistance force for relative sliding between the second rotating piece and the second mounting plate, to implement a damping function. Therefore, in a folding process of the electronic device, a magnetic torque force may be generated between the rotating piece and the mounting plate by using the magnetic attraction force between the magnetic piece and the magnetic fitting piece. This simplifies a structure of the hinge mechanism and implements a light and thin design of the electronic device.

When the electronic device is unfolded, the first rotating assembly and the second rotating assembly rotate away from each other. In this case, the first rotating piece and the first mounting plate separately rotate around the main shaft, and the first rotating piece may slide relative to the first mounting plate, so that the first magnetic piece and the first magnetic fitting piece magnetically attract and fit each other from a separated state, and a magnetic attraction force is generated between the first magnetic piece and the first magnetic fitting piece and gradually increases. The magnetic attraction force may drive the first rotating piece to slide relative to the first mounting plate. In addition, the second rotating piece and the second mounting plate separately rotate around the main shaft, and the second rotating piece may slide relative to the second mounting plate, so that the second magnetic piece and the second magnetic fitting piece magnetically attract and fit each other from a separated state, and a magnetic attraction force is generated between the second magnetic piece and the second magnetic fitting piece and gradually increases. The magnetic attraction force may drive the second rotating piece to slide relative to the second mounting plate. Therefore, in an unfolding process of the electronic device, power may be provided for relative sliding between the rotating piece and the mounting plate by using a magnetic attraction force between the magnetic piece and the magnetic fitting piece, to save external forces required for unfolding the electronic device, and implement a self-unfolding function of the electronic device.

When the magnetic piece and the magnetic fitting piece are specifically disposed, types of the first magnetic piece, the first magnetic fitting piece, the second magnetic piece, and the second magnetic fitting piece are not limited. In some possible technical solutions, the first magnetic piece and the first magnetic fitting piece may be permanent magnets. In some other possible technical solutions, the first magnetic piece may be a permanent magnet, and the first magnetic fitting piece may be an electromagnet; or the first magnetic piece may be an electromagnet, and the first magnetic fitting piece may be a permanent magnet. Similarly, both the second magnetic piece and the second magnetic fitting piece may be permanent magnets; or the second magnetic piece may be a permanent magnet, and the second magnetic fitting piece may be an electromagnet; or the second magnetic piece may be an electromagnet, and the second magnetic fitting piece may be a permanent magnet.

In this application, the first magnetic piece may magnetically attract and fit the first magnetic fitting piece. The first magnetic piece may have a first interface that is in contact with the first magnetic fitting piece through attraction and fitting. When the first mounting plate slides relative to the first rotating piece, the first magnetic piece and the first magnetic fitting piece may get away from or come close to each other in a direction parallel to the first interface, or the first magnetic piece and the first magnetic fitting piece may get away from or come close to each other in a direction perpendicular to the first interface. Similarly, the second magnetic piece may magnetically attract and fit the second magnetic fitting piece. The second magnetic piece may have a second interface that is in contact with the second magnetic fitting piece through attraction and fitting. When the second mounting plate slides relative to the second rotating piece, the second magnetic piece and the second magnetic fitting piece may get away from or come close to each other in a direction parallel to the second interface, or the second magnetic piece and the second magnetic fitting piece may get away from or come close to each other in a direction perpendicular to the second interface.

When the first rotating piece is specifically disposed, the first rotating piece may include a first arc-shaped rotating block and a first slider that are fastened to each other, and the first arc-shaped rotating block is located on a side that is of the first slider and that is close to the main shaft. The first magnetic piece is connected to the first slider. A first arc-shaped guiding groove is disposed on a side that is of the main shaft and that faces the first rotating piece, and the first arc-shaped rotating block may be accommodated in the first arc-shaped guiding groove and may slide in the first arc-shaped guiding groove to implement rotatable connection between the first rotating piece and the main shaft. The first mounting plate is provided with a first sliding groove, and the first slider may be accommodated in the first sliding groove and may slide in the first sliding groove to implement slidable connection between the first rotating piece and the first mounting plate. Similarly, when the second rotating piece is specifically disposed, the second rotating piece may include a second arc-shaped rotating block and a second slider that are fastened to each other, and the second arc-shaped rotating block is located on a side that is of the second slider and that is close to the main shaft. The second magnetic piece is connected to the second slider. A second arc-shaped guiding groove is disposed on a side that is of the main shaft and that faces the second rotating piece, and the second arc-shaped rotating block may be accommodated in the second arc-shaped guiding groove and may slide in the second arc-shaped guiding groove to implement rotatable connection between the second rotating piece and the main shaft. The second mounting plate is provided with a second sliding groove, and the second slider may be accommodated in the second sliding groove and may slide in the second sliding groove to implement slidable connection between the second rotating piece and the second mounting plate.

In some possible technical solutions, when the first magnetic piece and the first magnetic fitting piece get away from or come close to each other in a direction parallel to the contact interface for attraction and fitting, the first magnetic piece may be disposed on the first slider, and the first magnetic fitting piece is disposed in the first sliding groove. When the first slider slides along the first sliding groove, the first magnetic piece magnetically attracts and fits the first magnetic fitting piece or is separated from the first magnetic fitting piece in a direction parallel to the interface on which the first magnetic piece is in contact with the first magnetic fitting piece through attraction and fitting. Similarly, when the second magnetic piece and the second magnetic fitting piece get away from or come close to each other in a direction parallel to the contact interface for attraction and fitting, the second magnetic piece may be disposed on the second slider, and the second magnetic fitting piece is disposed in the second sliding groove. When the second slider slides in the second sliding groove, the second magnetic piece magnetically attracts and fits the second magnetic fitting piece or is separated from the second magnetic fitting piece in a direction parallel to the interface on which the second magnetic piece is in contact with the second magnetic fitting piece through attraction and fitting.

In some other possible technical solutions, when the first magnetic piece and the first magnetic fitting piece get away from or come close to each other in a direction perpendicular to the contact interface for attraction and fitting, the first rotating assembly may further include a first bracket. The first bracket is located on a side that is of the first mounting plate and that is away from the main shaft. One end that is of the first slider and that is away from the first arc-shaped rotating block extends out of the first sliding groove and is fastened to the first bracket. The first magnetic piece is disposed on the first bracket and faces the first mounting plate. The first magnetic fitting piece is disposed on a side that is of the first mounting plate and that is away from the main shaft, and faces the first magnetic piece. When the first slider slides along the first sliding groove, the first magnetic piece magnetically attracts and fits the first magnetic fitting piece or is separated from the first magnetic fitting piece in a direction perpendicular to the interface on which the first magnetic piece is in contact with the first magnetic fitting piece through attraction and fitting. Similarly, when the second magnetic piece and the second magnetic fitting piece get away from or come close to each other in a direction perpendicular to the contact interface for attraction and fitting, the second rotating assembly may further include a second bracket. The second bracket is located on a side that is of the second mounting plate and that is away from the main shaft. One end that is of the second slider and that is away from the second arc-shaped rotating block extends out of the second sliding groove and is fastened to the second bracket. The second magnetic piece is disposed on the second bracket and faces the second mounting plate. The second magnetic fitting piece is disposed on a side that is of the second mounting plate and that is away from the main shaft, and faces the second magnetic piece. When the second slider slides along the second sliding groove, the second magnetic piece magnetically attracts and fits the second magnetic fitting piece or is separated from the second magnetic fitting piece in a direction perpendicular to the interface on which the second magnetic piece is in contact with the second magnetic fitting piece through attraction and fitting.

To enhance structural strength of the first rotating assembly and the second rotating assembly, the first bracket and the first rotating piece may be an integrated structure, and the second bracket and the second rotating piece may be an integrated structure.

In addition, when the first rotating piece and the second rotating piece are arranged along the main shaft, the first rotating piece and the second rotating piece may be centro-symmetrically disposed along the main shaft, or the first rotating piece and the second rotating piece may be axial-symmetrically disposed along the main shaft.

According to a second aspect, this application provides an electronic device. The electronic device includes a flexible display, a first housing, a second housing, and the hinge mechanism according to the first aspect. The first housing is fastened to the first mounting plate, the second housing is fastened to the second mounting plate, and the flexible display continuously covers the first housing, the second housing, and the hinge mechanism, and is separately fastened to the first housing and the second housing. When the electronic device is folded, the magnetic piece and the magnetic fitting piece are gradually separated and a magnetic attraction force is generated, so that a magnetic torque force may be generated between the rotating piece and the mounting plate. This simplifies a structure of the hinge mechanism and implements a light and thin design of the electronic device. When the electronic device is unfolded, the magnetic piece and the magnetic fitting piece gradually approach to each other and the magnetic attraction force gradually increases, to provide power for relative sliding between the rotating piece and the mounting plate, save external forces required for unfolding the electronic device, and implement a self-unfolding function of the electronic device.

When the electronic device is specifically disposed, the hinge mechanism may be an inward folding hinge mechanism or an outward folding hinge mechanism. This is not specifically limited in this application. Specifically, when the hinge mechanism is an inward folding hinge mechanism, a rotation axis center of the first rotating piece rotating around the main shaft is located on a side that is of the main shaft and that faces the flexible display, and a rotation axis center of the second rotating piece rotating around the main shaft is located on the side that is of the main shaft and that faces the flexible display. When the hinge mechanism is an outward folding hinge mechanism, a rotation axis center of the first rotating piece rotating around the main shaft is located on a side that is of the main shaft and that is away from the flexible display, and a rotation axis center of the second rotating piece rotating around the main shaft is located on the side that is of the main shaft and that is away from the flexible display.

REFERENCE NUMERALS

10: electronic device;
11: first housing;

12: second housing;
13: flexible display;
14: hinge mechanism;
140: main shaft;
141: first rotating assembly;
142: second rotating assembly;
1401: first arc-shaped guiding groove;
1402: base;
1403: cover plate;
1404: first track groove;
1411: first rotating piece;
1412: first mounting plate;
1413: first magnetic piece;
1414: first magnetic fitting piece;
1415: first bracket;
1416: first support arm;
1417: first connecting piece;
1421: second rotating piece;
1422: second mounting plate;
1423: second magnetic piece;
1424: second magnetic fitting piece;
1425: second bracket;
1426: second support arm;
1427: second connecting piece;
14111: first arc-shaped rotating block;
14112: first slider;
14121: first sliding groove;
14151: first accommodation groove;
14211: second arc-shaped rotating block;
14212: second slider;
14221: second sliding groove;
14251: second accommodation groove.

DETAILED DESCRIPTION OF ILLUSTRATIVE EMBODIMENTS

To make the objectives, technical solutions, and advantages of this application clearer, the following further describes this application in detail with reference to the accompanying drawings.

Figure 1:
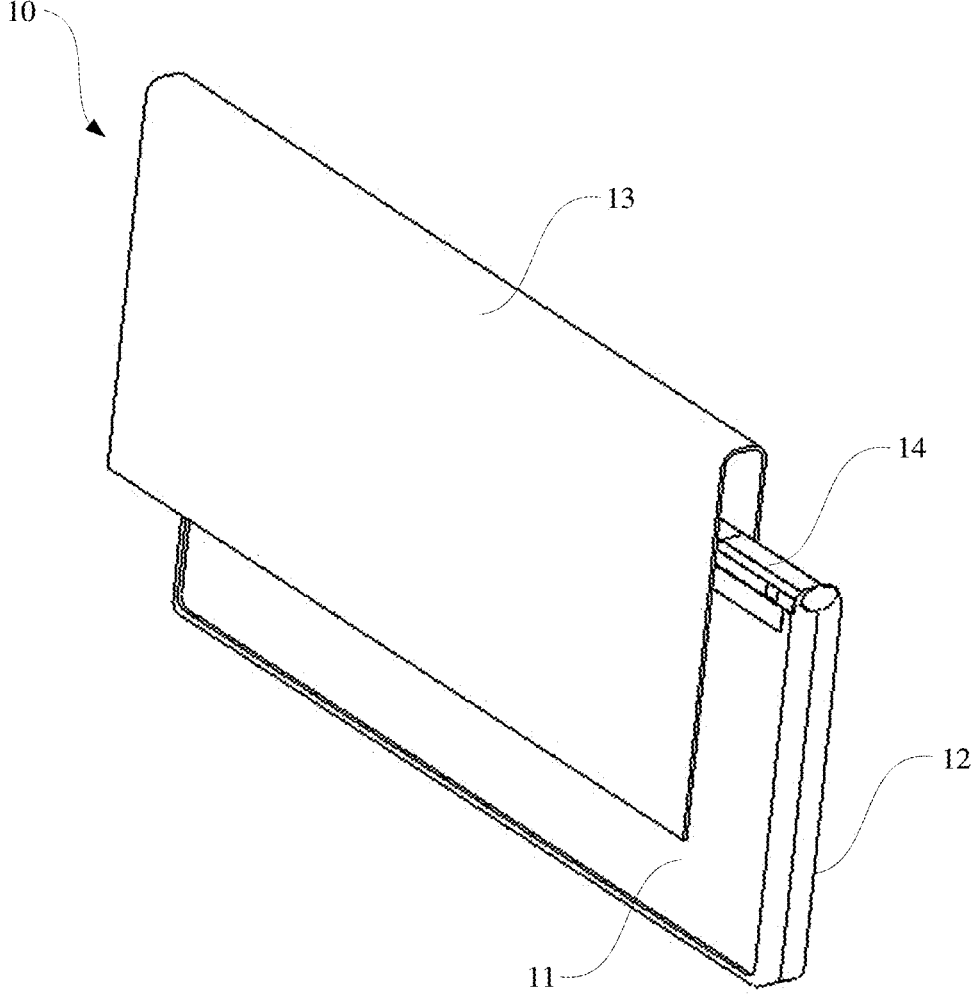
FIG. 1 is a three-dimensional diagram of an electronic device in a folded state according to an embodiment of this application.

For ease of understanding of a hinge mechanism provided in embodiments of this application, the following describes an application scenario of the hinge mechanism. The hinge mechanism may be used in, but is not limited to, a mobile phone, an intelligent wearable device, a tablet computer, a notebook computer, and another foldable electronic device. When the hinge mechanism provided in embodiments of this application is used in an electronic device, refer to FIG. 1. FIG. 1 is a three-dimensional diagram of an electronic device in a folded state according to an embodiment of this application. The electronic device 10 provided in this application may be an outward foldable electronic device. In addition to a hinge mechanism 14, the electronic device 10 may further include a flexible display 13, a first housing 11, and a second housing 12. The flexible display 13 is disposed on the hinge mechanism 14. Specifically, the first housing 11 and the second housing 12 are disposed on two sides of the hinge mechanism 14, and may rotate around the hinge mechanism 14. When the electronic device 10 is used, the electronic device 10 may be folded and unfolded based on different usage scenarios. An outward foldable electronic device is used as an example. When the electronic device 10 is in an unfolded state, the flexible display 13 is disposed on a same side of the hinge mechanism 14, the first housing 11, and the second housing 12, and is connected to the hinge mechanism 14, the first housing 11, and the second housing 12. In this case, an outer surface that is of the first housing

11 and that is away from the flexible display 13 and an outer surface that is of the second housing 12 and that is away from the flexible display 13 may be jointly used as an appearance surface of the electronic device 10. As shown in FIG. 1, when the electronic device 10 is in a folded state, the first housing 11 and the second housing 12 are disposed opposite to each other, and the flexible display 13 may be used as both a display surface of the electronic device 10 and an appearance surface of the electronic device 10. It may be understood that a process in which the electronic device 10 changes from the unfolded state to the folded state or from the folded state to the unfolded state is a process in which the first housing 11 and the second housing 12 rotate around the hinge mechanism 14. In this process, the flexible display 13 is bent or flattened along with the first housing 11 and the second housing 12. Certainly, the electronic device 10 may alternatively be an inward foldable electronic device. When the electronic device 10 is in a folded state, the first housing 11, the second housing 12, and the hinge mechanism 14 can form an accommodation space that is in a shape similar to a water drop and that meets a bending requirement of the flexible display 13, to avoid pulling or squeezing the flexible display 13, so that a risk of damage to the flexible display 13 can be reduced.

Currently, in some foldable electronic devices, a slider and a sliding groove are disposed on the hinge mechanism. When the hinge mechanism is folded or unfolded, the slider slides along the sliding groove, to limit a rotation direction of the hinge mechanism. However, when the hinge mechanism is subject to a slight external force in a flattened state, the foldable electronic device may shake, affecting reliability of an overall structure of the electronic device and user experience.

Therefore, this application provides a hinge mechanism and an electronic device, to generate a magnetic torque force between a rotating piece and a mounting plate by using a magnetic attraction force between a magnetic piece and a magnetic fitting piece. This simplifies a structure of the hinge mechanism and implements a light and thin design of the electronic device.

It should be noted that, terms used in the following embodiments are merely intended to describe specific embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly.

Reference to "an embodiment", "some embodiments", or the like described in this specification indicates that one or more embodiments of this application include a specific feature, structure, or characteristic described with reference to this embodiment. Therefore, statements such as "in an embodiment", "in some embodiments", "in some other embodiments", and "in other embodiments" that appear at different places in this specification do not necessarily mean a same embodiment. Instead, the statements mean "one or more but not all of embodiments", unless otherwise specifically emphasized in another manner. The terms "include", "comprise", "have", and variants thereof all mean "include but are not limited to", unless otherwise specifically emphasized in another manner.

Figure 2:
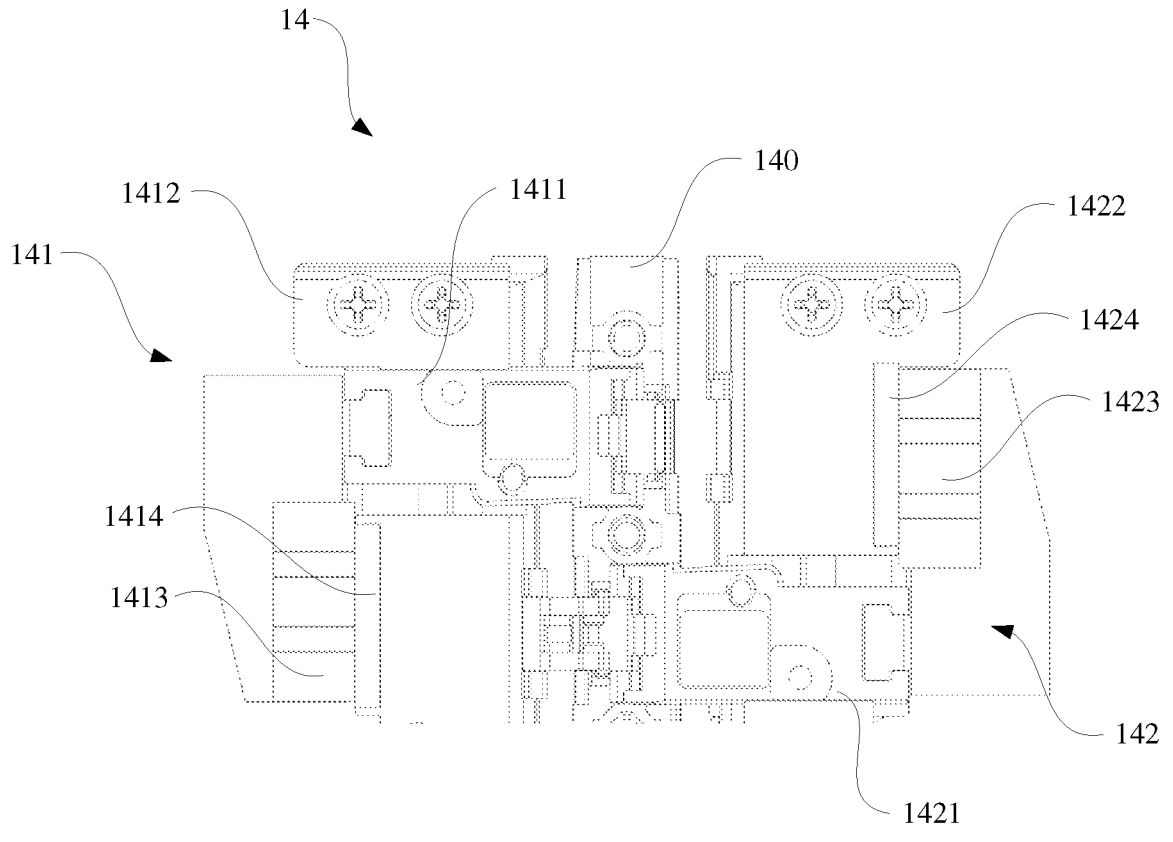
FIG. 2 is a diagram of a structure of a hinge mechanism according to an embodiment of this application.
Figure 3:
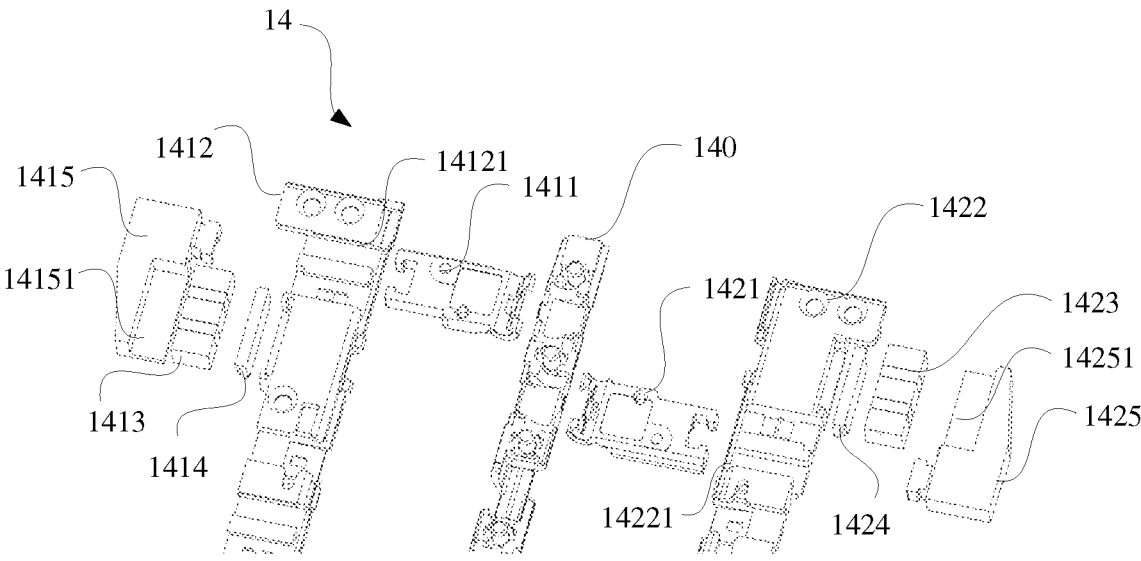
FIG. 3 is a three-dimensional assembly diagram of a hinge mechanism according to an embodiment of this application.

FIG. 2 is a diagram of a structure of a hinge mechanism according to an embodiment of this application. FIG. 3 is a three-dimensional assembly diagram of the hinge mechanism according to an embodiment of this application. As shown in FIG. 2 and FIG. 3, the hinge mechanism 14 includes a main shaft 140 and a rotating module. A quantity of rotating modules in the hinge mechanism 14 is not limited in this application. For example, the hinge mechanism 14 may include only one rotating module, or may include a plurality of rotating modules. When the hinge mechanism 14 includes a plurality of rotating modules, the plurality of rotating modules may be spaced in a length direction of the hinge mechanism 14. In this application, the length direction of the hinge mechanism 14 is an extension direction of a rotation axis of the first housing 11 and the second housing 12 around the hinge mechanism 14 shown in FIG. 1.

Still with reference to FIG. 2 and FIG. 3, the rotating module may include a first rotating assembly 141 and a second rotating assembly 142. The first rotating assembly 141 and the second rotating assembly 142 are disposed opposite to each other on two sides of the main shaft 140. The main shaft 140 may serve as a bearing component of the first rotating assembly 141 and the second rotating assembly 142. It should be noted that, in embodiments of this application, when there are a plurality of rotating modules, first rotating assemblies 141 and second rotating assemblies 142 of the plurality of rotating modules may all use the same main shaft 140 as a bearing component, to improve an integration degree of the hinge mechanism 14. In some other possible embodiments of this application, the hinge mechanism 14 may be provided with one main shaft 140 corresponding to each rotating module, so that a first rotating assembly 141 and a second rotating assembly 142 of each rotating module use the corresponding main shaft 140 as a bearing component.

Specifically, the first rotating assembly 141 may include a first rotating piece 1411, a first mounting plate 1412, a first magnetic piece 1413, and a first magnetic fitting piece 1414. The first rotating piece 1411 and the first mounting plate 1412 are separately rotatably connected to the main shaft 140, a rotation axis center of the first rotating piece 1411 relative to the main shaft 140 is parallel to and does not overlap a rotation axis center of the first mounting plate 1412 relative to the main shaft 140, and the first rotating piece 1411 may be slidably connected to the first mounting plate 1412. The first magnetic piece 1413 is disposed on the first rotating piece 1411, the first magnetic fitting piece 1414 is disposed on the first mounting plate 1412, and the first magnetic piece 1413 may magnetically attract and fit the first magnetic fitting piece 1414. Correspondingly, the second rotating assembly 142 may include a second rotating piece 1421, a second mounting plate 1422, a second magnetic piece 1423, and a second magnetic fitting piece 1424. The second rotating piece 1421 and the second mounting plate 1422 are separately rotatably connected to the main shaft 140, a rotation axis center of the second rotating piece 1421 relative to the main shaft 140 is parallel to and does not overlap a rotation axis center of the second mounting plate 1422 relative to the main shaft 140, and the second rotating piece 1421 may be slidably connected to the second mounting plate 1422. The second magnetic piece 1423 is disposed on the second rotating piece 1421, the second magnetic fitting piece 1424 is disposed on the second mounting plate 1422, and the second magnetic piece 1423 may magnetically attract and fit the second magnetic fitting piece 1424.

Figure 4:
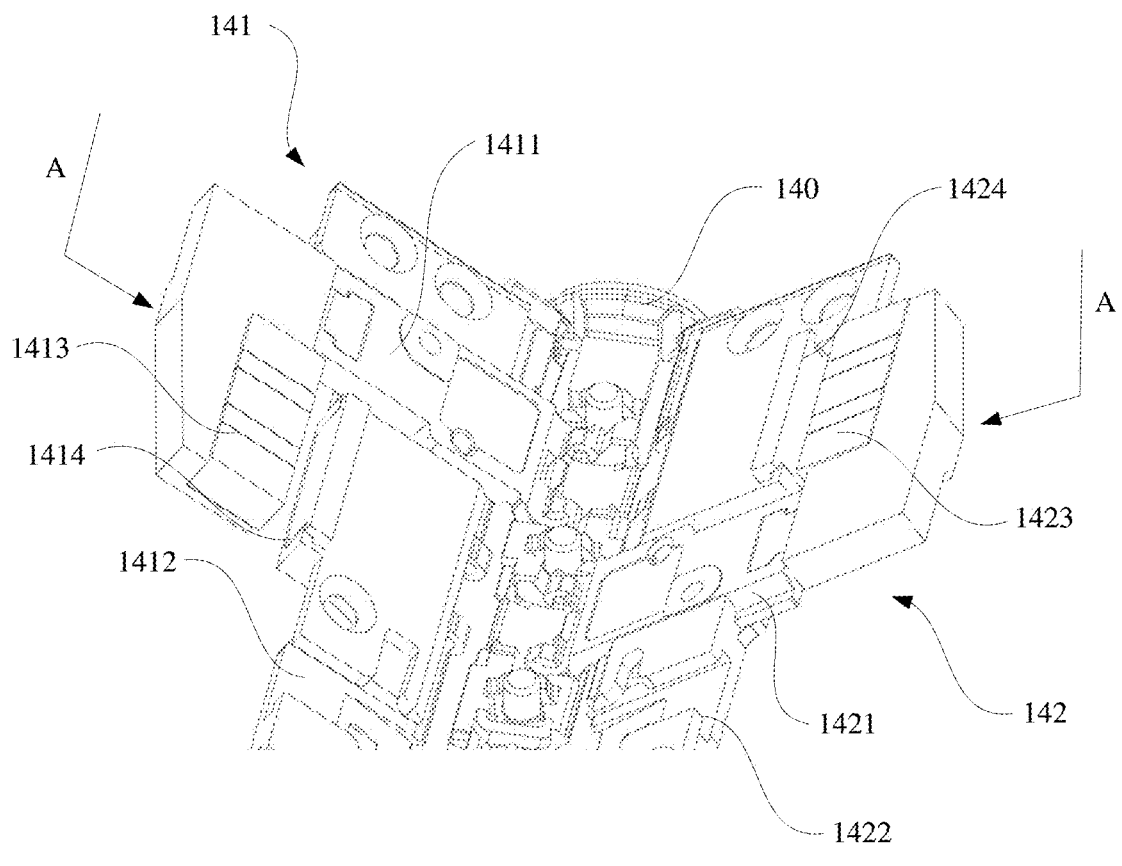
FIG. 4 is a diagram of folding of a hinge mechanism according to an embodiment of this application.
Figure 5:
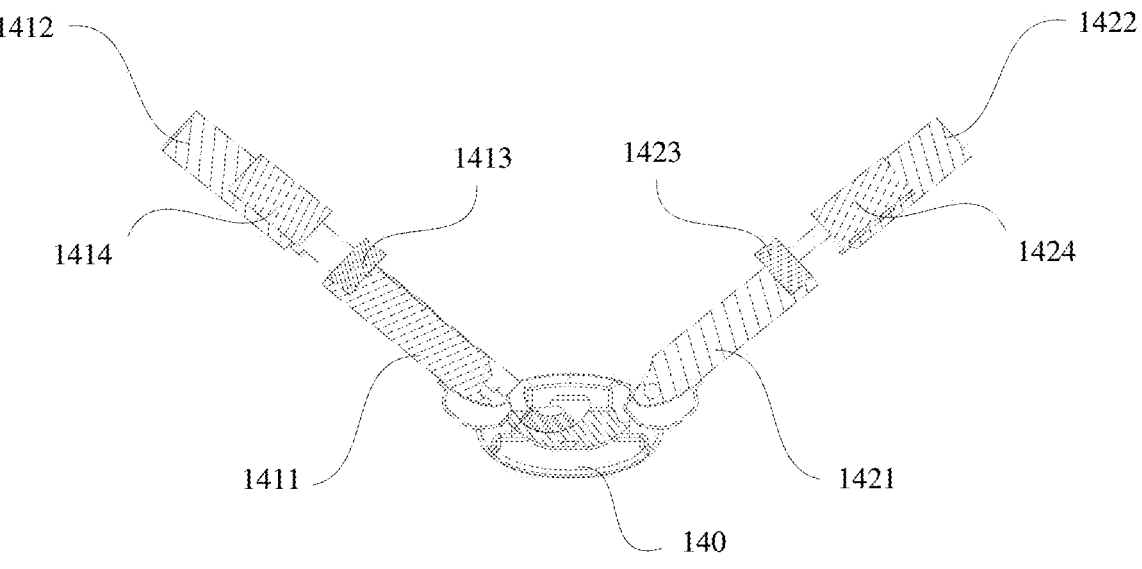
FIG. 5 is a sectional view of the hinge mechanism in FIG. 4 in an A-A direction.

FIG. 4 is a diagram of folding of the hinge mechanism according to an embodiment of this application. FIG. 5 is a sectional view of the hinge mechanism in FIG. 4 in an A-A direction. As shown in FIG. 4 and FIG. 5, when the electronic device 10 is folded, the first rotating assembly 141 and the second rotating assembly 142 of the hinge mechanism 14 rotate toward each other. In this case, the first rotating piece 1411 and the first mounting plate 1412 may separately rotate around the main shaft 140, and in a rotation process, a phase difference between axis centers of the first rotating piece 1411 and the first mounting plate 1412 that are disposed on a same side is implemented, so that the first mounting plate 1412 may slide relative to the first rotating piece 1411 in a direction away from the main shaft 140. In this way, the first magnetic piece 1413 and the first magnetic fitting piece 1414 are gradually away from each other from an attraction and fitting state, and a magnetic attraction force is generated between the first magnetic piece 1413 and the first magnetic fitting piece 1414. The magnetic attraction force may provide a first resistance force for relative sliding between the first rotating piece 1411 and the first mounting plate 1412, to implement a damping function. In addition, the second rotating piece 1421 and the second mounting plate 1422 also separately rotate around the main shaft 140, and in a rotation process, a phase difference between axis centers of the second rotating piece 1421 and the second mounting plate 1422 that are disposed on a same side is implemented, so that the second mounting plate 1422 may slide relative to the second rotating piece 1421 in a direction away from the main shaft 140. In this way, the second magnetic piece 1423 and the second magnetic fitting piece 1424 are gradually away from each other from an attraction and fitting state, and a magnetic attraction force is generated between the second magnetic piece 1423 and the second magnetic fitting piece 1424. The magnetic attraction force may provide a second resistance force for relative sliding between the second rotating piece 1421 and the second mounting plate 1422, to implement a damping function. In this way, in a folding process, damping effect on relative sliding between the first rotating piece 1411 and the first mounting plate 1412 may be generated by using the magnetic attraction force between the first magnetic piece 1413 and the first magnetic fitting piece 1414, and damping effect on relative sliding between the second rotating piece 1421 and the second mounting plate 1422 may be generated by using the magnetic attraction force between the second magnetic piece 1423 and the second magnetic fitting piece 1424, to provide a torque force for the first rotating assembly 141 and the second rotating assembly 142 to rotate toward each other, so as to implement stable rotation.

Figure 6:
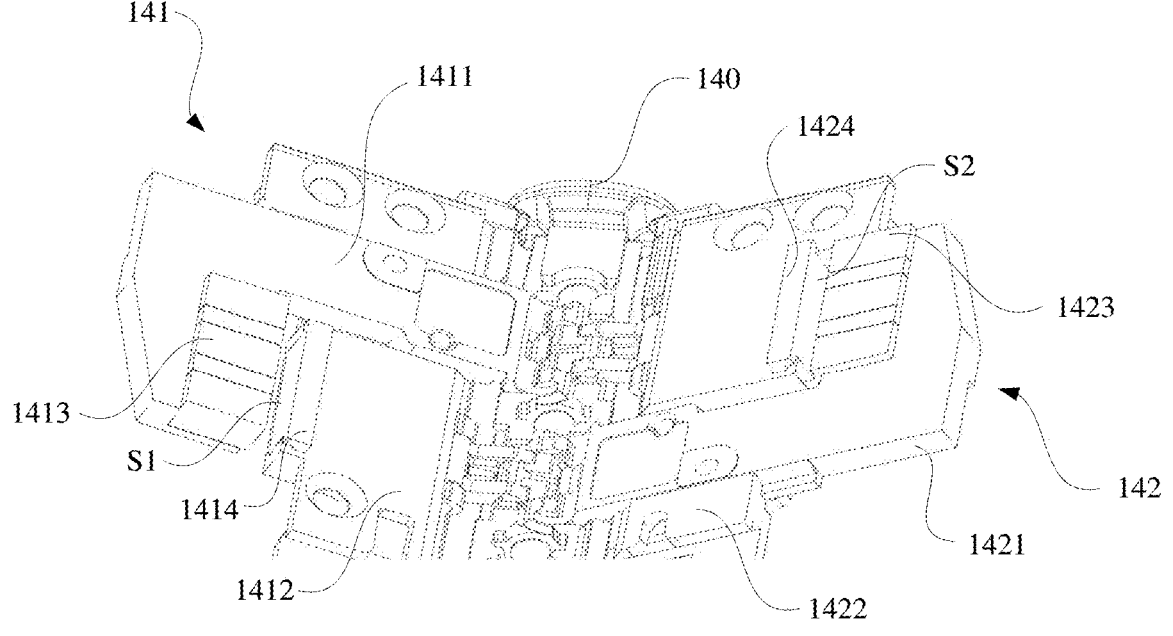
FIG. 6 is a diagram of folding of a hinge mechanism according to an embodiment of this application.
Figure 7:
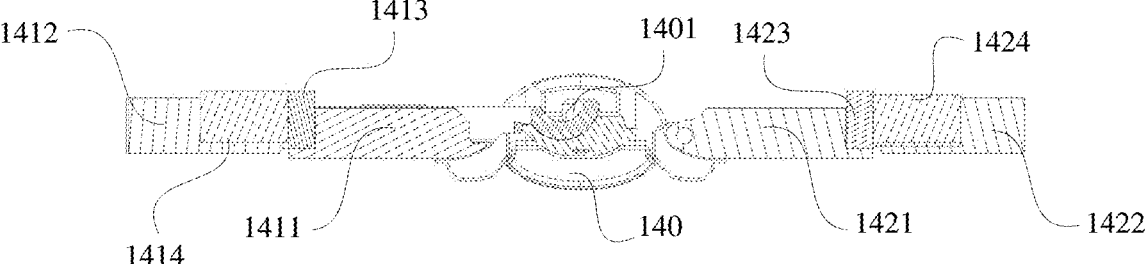
FIG. 7 is a sectional view of a hinge mechanism in an unfolded state according to an embodiment of this application.

FIG. 6 is a diagram of folding of the hinge mechanism according to an embodiment of this application. FIG. 7 is a sectional view of the hinge mechanism in an unfolded state according to an embodiment of this application. As shown in FIG. 6 and FIG. 7, when the electronic device 10 is unfolded, the first rotating assembly 141 and the second rotating assembly 142 rotate away from each other. In this case, the first rotating piece 1411 and the first mounting plate 1412 separately rotate around the main shaft 140, and in a rotation process, a phase difference between axis centers of the first rotating piece 1411 and the first mounting plate 1412 that are disposed on a same side is implemented, so that the first mounting plate 1412 may slide relative to the first rotating piece 1411 in a direction close to the main shaft 140. In this way, the first magnetic piece 1413 and the first magnetic fitting piece 1414 gradually approach to each other from a separated state, and a magnetic attraction force is generated between the first magnetic piece 1413 and the first magnetic fitting piece 1414 and gradually increases until the first magnetic piece 1413 attracts and fits the first magnetic fitting piece 1414. The magnetic attraction force may drive the first rotating piece 1411 to slide relative to the first mounting plate 1412. In addition, the second rotating piece 1421 and the second mounting plate 1422 separately rotate around the main shaft 140, and in a rotation process, a phase difference between axis centers of the second rotating piece 1421 and the second mounting plate 1422 that are disposed on a same side is implemented, so that the second mounting plate 1422 may slide relative to the second rotating piece 1421. In this way, the second magnetic piece 1423 and the second magnetic fitting piece 1424 gradually approach to each other from a separated state, and a magnetic attraction force is generated between the second magnetic piece 1423 and the second magnetic fitting piece 1424 and gradually increases until the second magnetic piece 1423 attracts and fits the second magnetic fitting piece 1424. The magnetic attraction force may drive the second rotating piece 1421 to slide relative to the second mounting plate 1422. In this way, in an unfolding process, a first force for relative sliding between the first rotating piece 1411 and the first mounting plate 1412 may be generated by using the magnetic attraction force between the first magnetic piece 1413 and the first magnetic fitting piece 1414, and a second force for relative sliding between the second rotating piece 1421 and the second mounting plate 1422 may be generated by using the magnetic attraction force between the second magnetic piece 1423 and the second magnetic fitting piece 1424. This reduces an external force required for unfolding the electronic device 10 and implements a self-unfolding function of the electronic device 10.

In the hinge mechanism 14, the magnetic piece is disposed on the rotating piece, and the magnetic fitting piece is disposed on the mounting plate. A magnetic torque force is generated between the rotating piece and the mounting plate by using the magnetic attraction force between the magnetic piece and the magnetic fitting piece. This simplifies a structure of the hinge mechanism 14 and implements a light and thin design of the electronic device 10.

In some embodiments of this application, both the first magnetic piece 1413 and the first magnetic fitting piece 1414 may be permanent magnets, to further simplify a mechanism of the hinge mechanism 14 and reduce manufacturing costs of the electronic device 10. In some other embodiments, the first magnetic piece 1413 may be a permanent magnet, and the first magnetic fitting piece 1414 may be an electromagnet. A current and a quantity of coil turns of the electromagnet are controlled, so that the magnetic attraction force between the first magnetic piece 1413 and the first magnetic fitting piece 1414 may be adjusted, to adjust the magnetic torque force. Correspondingly, both the second magnetic piece 1423 and the second magnetic fitting piece 1424 may be permanent magnets; or the second magnetic piece 1423 may be a permanent magnet, and the second magnetic fitting piece 1424 may be an electromagnet. Details are not described herein again.

Figure 8:
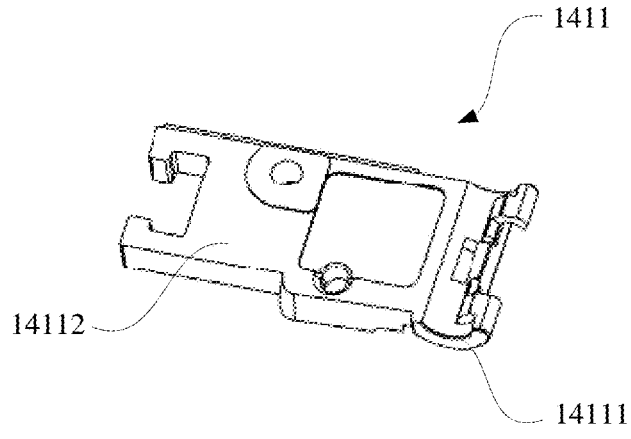
FIG. 8 is a diagram of a first sliding piece according to an embodiment of this application.
Figure 8:
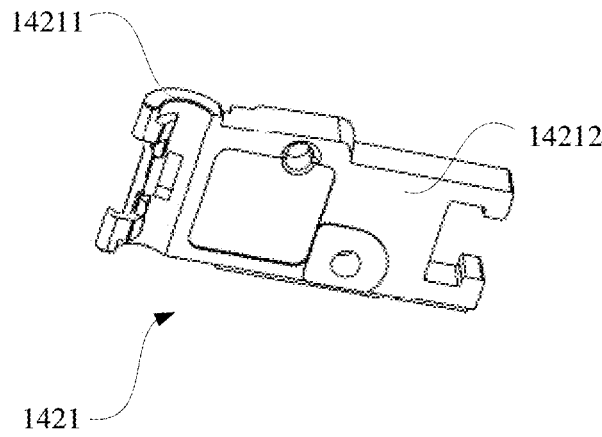

FIG. 8 is a diagram of a first sliding piece according to an embodiment of this application. As shown in FIG. 8, in some embodiments of this application, the first rotating piece 1411 may specifically include a first arc-shaped rotating block 14111 and a first slider 14112 that are fastened to each other. The first arc-shaped rotating block 14111 is located on a side that is of the first slider 14112 and that is close to the main shaft 140. The first magnetic piece 1413 may be connected to the first slider 14112. As shown in FIG. 7, a first arc-shaped guiding groove 1401 is disposed on a side that is of the main shaft 140 and that faces the first rotating piece 1411. The first arc-shaped rotating block 14111 may be accommodated in the first arc-shaped guiding groove 1401 and may slide in the first arc-shaped guiding groove 1401 to implement rotatable connection between the first rotating piece 1411 the main shaft 140. As shown in FIG. 3, the first mounting plate 1412 is provided with a first sliding groove 14121, and the first slider 14112 may be accommodated in the first sliding groove 14121 and may slide in the first sliding groove 14121 to implement slidable connection between the first rotating piece 1411 and the first mounting plate 1412. Correspondingly, as shown in FIG. 3 and FIG. 8, the second rotating piece 1421 may specifically include a second arc-shaped rotating block 14211 and a second slider 14212 that are fastened to each other. The second arc-shaped rotating block 14211 is located on a side that is of the second slider 14212 and that is close to the main shaft 140. The second magnetic piece 1423 may be connected to the second slider 14212. A second arc-shaped guiding groove (not shown in the figure) is disposed on a side that is of the main shaft 140 and that faces the second rotating piece 1421, and the second arc-shaped rotating block 14211 may be accommodated in the second arc-shaped guiding groove and may slide in the second arc-shaped guiding groove to implement rotatable connection between the second rotating piece 1421 and the main shaft 140. The second mounting plate 1422 is provided with a second sliding groove 14221, and the second slider 14212 may be accommodated in the second sliding groove 14221 and may slide in the second sliding groove 14221 to implement slidable connection between the second rotating piece 1421 and the second mounting plate 1422.

One end of the first slider 14112 is fastened to the first arc-shaped rotating block 14111, and the other end of the first slider 14112 extends from one end that is of the first sliding groove 14121 and that is away from the main shaft 140, and is limited to an end portion of the first sliding groove 14121, to prevent the first slider 14112 from accidentally sliding out of the first sliding groove 14121. Correspondingly, one end of the second slider 14212 is fastened to the second arc-shaped rotating block 14211, and the other end of the second slider 14212 extends from one end that is of the second sliding groove 14221 and that is away from the main shaft 140, and is limited to an end portion of the second sliding groove 14221, to prevent the second slider 14212 from accidentally sliding out of the second sliding groove 14221.

In this embodiment of this application, relative locations of the first rotating piece 1411 and the second rotating piece 1421 are not specifically limited. For example, in some embodiments, the first rotating piece 1411 and the second rotating piece 1421 may be axial-symmetrically disposed along the main shaft 140. As shown in FIG. 6, in some other embodiments, the first rotating piece 1411 and the second rotating piece 1421 may alternatively be centro-symmetrically disposed along the main shaft 140.

In some embodiments, the first magnetic piece 1413 may be disposed on the first slider 14112, and the first magnetic fitting piece 1414 is disposed in the first sliding groove 14121. When the first slider 14112 slides along the first sliding groove 14121, the first magnetic piece 1413 magnetically attracts and fits the first magnetic fitting piece 1414 or is separated from the first magnetic fitting piece 1414 in a direction parallel to an interface on which the first magnetic piece 1413 is in contact with the first magnetic fitting piece 1414 through attraction and fitting. Similarly, the second magnetic piece 1423 may be disposed on the second slider 14212, and the second magnetic fitting piece is disposed in the second sliding groove. When the second slider 14212 slides in the second sliding groove, the second magnetic piece 1423 magnetically attracts and fits the second magnetic fitting piece 1424 or is separated from the second magnetic fitting piece 1424 in a direction parallel to an interface on which the second magnetic piece 1423 is in contact with the second magnetic fitting piece 1424 through attraction and fitting.

Figure 9:
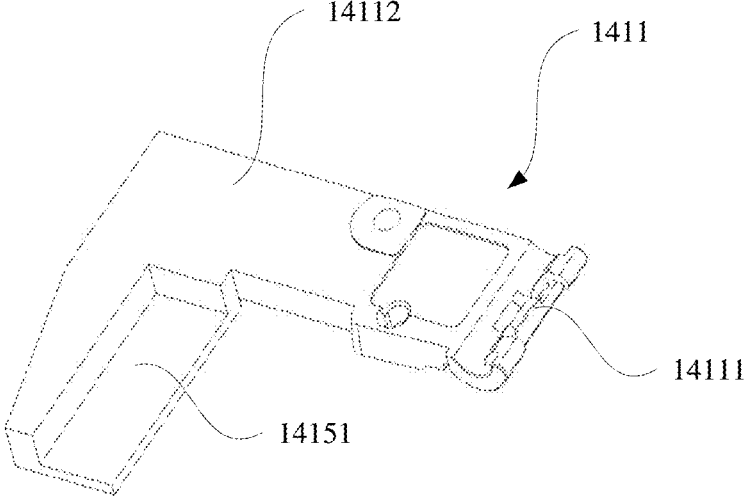
FIG. 9 is another diagram of a first sliding piece according to an embodiment of this application.
Figure 9:
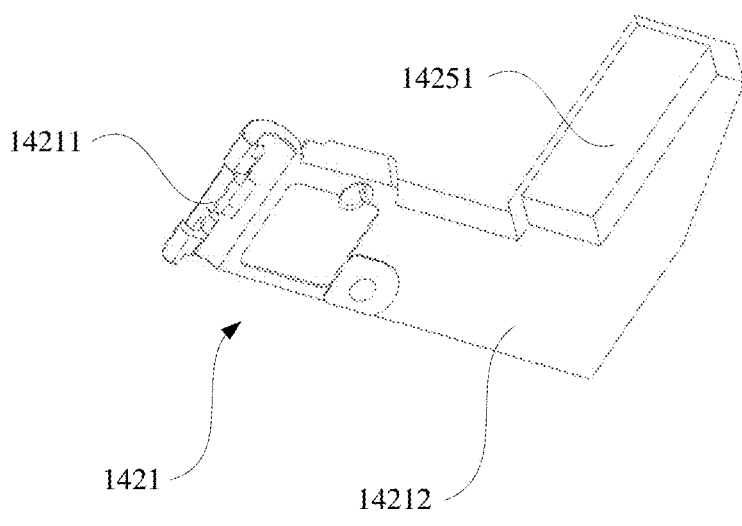

As shown in FIG. 3, in some other embodiments, the first rotating assembly 141 may further include a first bracket 1415, and the first bracket 1415 is connected to the first rotating piece 1411. In this embodiment, the first bracket 1415 may be provided with a first accommodation groove 14151, and the first magnetic fitting piece 1414 may be mounted in the first accommodation groove 14151. Correspondingly, the second rotating assembly 142 may further include a second bracket 1425, and the second bracket 1425 is connected to the second rotating piece 1421. The second bracket 1425 may be provided with a second accommodation groove 14251, and the second magnetic fitting piece 1424 may be mounted in the second accommodation groove 14251. In the foregoing embodiment, the first bracket 1415 may be connected to the first rotating piece 1411 in a manner of welding, bonding, threaded connection, clamping, or the like, and the second bracket 1425 may be connected to the second rotating piece 1421 in a manner of welding, bonding, threaded connection, clamping, or the like. FIG. 9 is another diagram of a first sliding piece according to an embodiment of this application. As shown in FIG. 6 and FIG. 9, in some other embodiments, the first bracket 1415 and the first rotating piece 1411 may be an integrated structure, and the second bracket 1425 and the second rotating piece 1421 may also be an integrated structure, to reduce a quantity of parts of the hinge mechanism 14 and simplify a structure of the electronic device 10.

As shown in FIG. 6, in this application, the first magnetic piece 1413 may have a first interface S1 that is in contact with the first magnetic fitting piece 1414 through attraction and fitting, and the second magnetic piece 1423 may have a second interface S2 that is in contact with the second magnetic fitting piece 1424. In some embodiments, when the first mounting plate 1412 slides relative to the first rotating piece 1411, the first magnetic piece 1413 and the first magnetic fitting piece 1414 may get away from or come close to each other in a direction parallel to the first interface S1. In this case, the first magnetic piece 1413 may be disposed on a side that is of the first slider 14112 and that faces the first sliding groove 14121, and the first magnetic fitting piece 1414 may be correspondingly disposed in the first sliding groove 14121. When the second mounting plate 1422 slides relative to the second rotating piece 1421, the second magnetic piece 1423 and the second magnetic fitting piece 1424 may get away from or come close to each other in a direction parallel to the second interface S2. In this case, the second magnetic piece 1423 may be disposed on a side that is of the second slider 14212 and that faces the second sliding groove 14221, and the second magnetic fitting piece 1424 may be correspondingly disposed in the second sliding groove 14221. In some other embodiments, when the first mounting plate 1412 slides relative to the first rotating piece 1411, the first magnetic piece 1413 and the first magnetic fitting piece 1414 may get away from or come close to each other in a direction perpendicular to the first interface S1. In this case, the first magnetic piece 1413 may be disposed on a side that is of the first slider 14112 and that faces an end face of the first sliding groove 14121, and the first magnetic fitting piece 1414 may be disposed on an end that is of the first sliding groove 14121 and that is away from the main shaft 140. In this embodiment, the first rotating piece 1411 may be an L-shaped rotating piece. Alternatively, the first magnetic piece 1413 may be disposed in the first accommodation groove 14151 of the first bracket 1415, and the first magnetic fitting piece 1414 is disposed on a side that is of the first mounting plate 1412 and that is away from the main shaft 140, and faces the first magnetic piece 1413. When the second mounting plate 1422 slides relative to the second rotating piece 1421, the second magnetic piece 1423 and the second magnetic fitting piece 1424 may get away from or come close to each other in a direction perpendicular to the second interface S2. In this case, the second magnetic piece 1423 may be disposed on a side that is of the second slider 14212 and that faces an end face of the second sliding groove 14221, and the second magnetic fitting piece 1424 may be disposed on an end that is of the second sliding groove 14221 and that is away from the main shaft 140. In this embodiment, the second rotating piece 1421 may be an L-shaped rotating piece. Alternatively, the second magnetic piece 1423 may be disposed in the second accommodation groove 14251 of the second bracket 1425, and the second magnetic fitting piece 1424 is disposed on a side that is of the second mounting plate 1422 and that is away from the main shaft 140, and faces the second magnetic piece 1423.

Figures 10, 11:
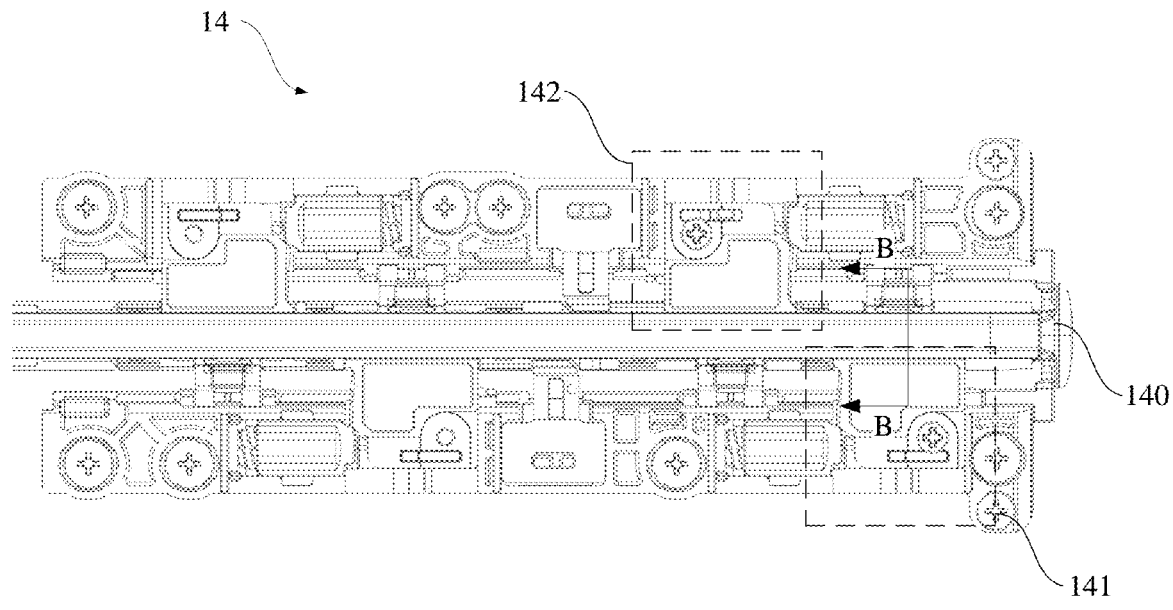
FIG. 10 is a diagram of another structure of a hinge mechanism according to an embodiment of this application.
FIG. 11 is a three-dimensional assembly diagram of the hinge mechanism in FIG. 10.

As shown in FIG. 4, the first rotating piece 1411 and the second rotating piece 1421 may be used as a driving mechanism for folding or unfolding the electronic device 10. FIG. 10 is a diagram of another structure of the hinge mechanism according to an embodiment of this application. FIG. 11 is a three-dimensional assembly diagram of the hinge mechanism in FIG. 10. As shown in FIG. 10 and FIG. 11, in a structure of the hinge structure 14, the first rotating assembly 141 may further include a first support arm 1416 and a first connecting piece 1417. The first connecting piece 1417 is located between the first rotating piece 1411 and the first support arm 1416, the first connecting piece 1417 is rotatably connected to the first rotating piece 1411, and the first connecting piece 1417 is rotatably connected to the first support arm 1416, so that mutual pulling movement is performed between the first rotating piece 1411 and the first support arm 1416 by using the first connecting piece 1417. Correspondingly, the second rotating assembly 142 may further include a second support arm 1426 and a second connecting piece 1427. The second connecting piece 1427 is located between the second rotating piece 1421 and the second support arm 1426, the second connecting piece 1427 is rotatably connected to the second rotating piece 1421, and the second connecting piece 1427 is rotatably connected to the second support arm 1426, so that mutual pulling movement is performed between the second rotating piece 1421 and the second support arm 1426 by using the second connecting piece 1427.

Figure 12:
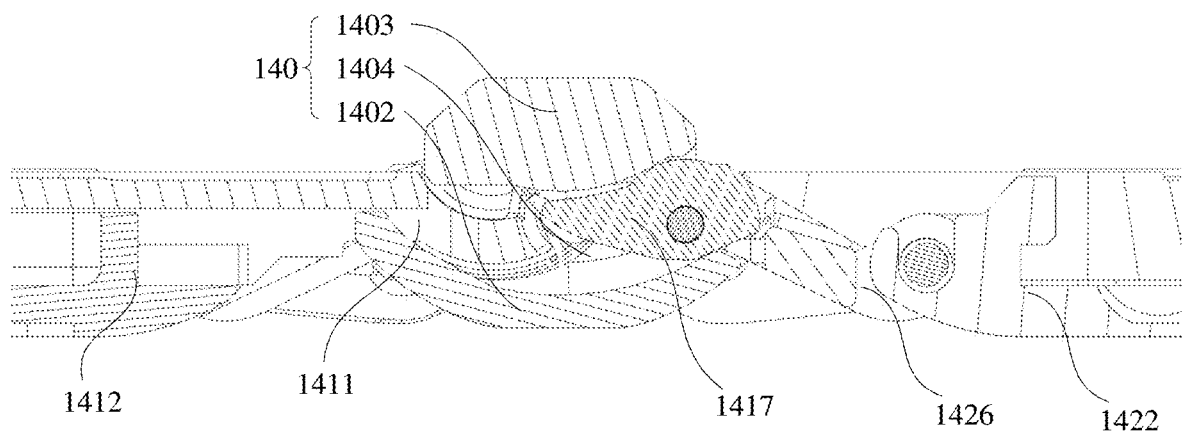
FIG. 12 is a sectional view of the hinge mechanism in FIG. 10 in B-B when an electronic device is in an unfolded state.
Figure 13:
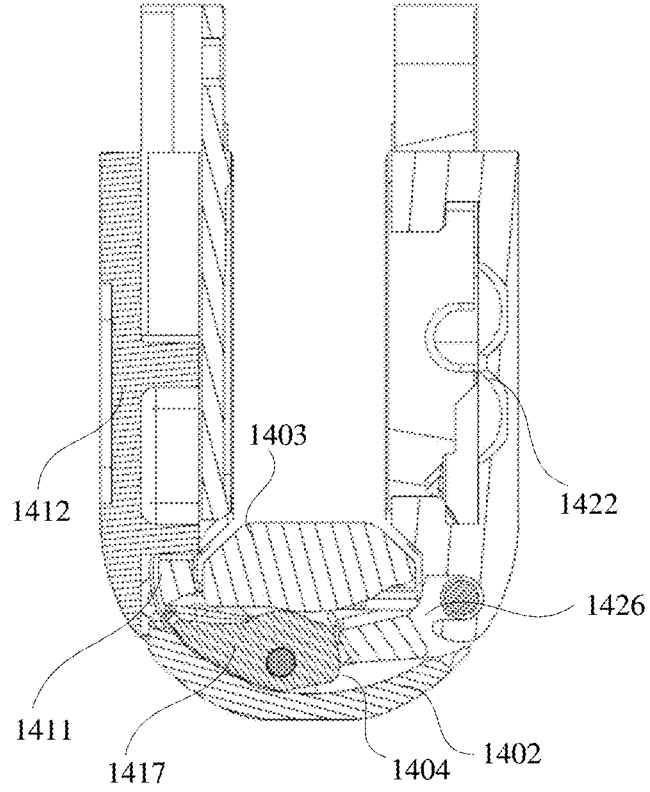
FIG. 13 is a diagram of the hinge mechanism in FIG. 12 when an electronic device is in a closed state.

FIG. 12 is a sectional view of the hinge mechanism in FIG. 10 in B-B when an electronic device is in an unfolded state, and FIG. 13 is a diagram of the hinge mechanism in FIG. 12 when an electronic device is in a closed state. As shown in FIG. 12 and FIG. 13, in the foregoing embodiment, the main shaft 140 may include a base 1402 and a cover plate 1403, and the cover plate 1403 covers the base 1402. The base 1402 is provided with a first track groove 1404, and the first connecting piece 1417 may move along the first track groove 1404, to limit a moving track of the first connecting piece 1417. In a process in which the electronic device 10 changes from the unfolded state to the closed state, the first connecting piece 1417 may move in the first track groove 1404 toward the first rotating piece 1411, and in a process in which the electronic device 10 changes from the closed state to the unfolded state, the first connecting piece 1417 may move in the first track groove 1404 toward the first support arm 1416, so that the first connecting piece 1417 can move relative to the main shaft 140 based on a specified track.

Similarly, the base 1402 is provided with a second track groove, and the second connecting piece 1427 may move along the second track groove, to limit a moving track of the second connecting piece 1427. In a process in which the electronic device 10 changes from the unfolded state to the closed state, the second connecting piece 1427 may move in the second track groove toward the second rotating piece 1421, and in a process in which the electronic device 10 changes from the closed state to the unfolded state, the second connecting piece 1427 may move in the second track groove toward the second support arm 1426, so that the second connecting piece 1427 can move relative to the main shaft 140 based on a specified track. Certainly, in some other embodiments, the first rotating piece 1411 and the second rotating piece 1421 may alternatively be used as limiting structures, and are used to limit a folding direction and an unfolding direction of the electronic device 10.

When the electronic device 10 is an outward foldable electronic device, the hinge mechanism 14 is an outward folding hinge mechanism. A rotation axis center of the first rotating piece 1411 rotating around the main shaft 140 is located on a side that is of the main shaft 140 and that is away from the flexible display 13, and a rotation axis center of the second rotating piece 1421 rotating around the main shaft 140 is located on the side that is of the main shaft 140 and that is away from the flexible display 13. When the electronic device 10 is an inward foldable electronic device, the hinge mechanism 14 is an inward folding hinge mechanism. A rotation axis center of the first rotating piece 1411 rotating around the main shaft 140 is located on a side that is of the main shaft 140 and that faces the flexible display 13, and a rotation axis center of the second rotating piece 1421 rotating around the main shaft 140 is located on the side that is of the main shaft 140 and that faces the flexible display 13.

Terms used in the foregoing embodiments are merely intended to describe specific embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly.

The foregoing descriptions are merely specific implementations of this application, but the protection scope of this application is not limited thereto. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A hinge mechanism, configured to be used in a foldable electronic device, wherein the hinge mechanism comprises:
   a main shaft;
   a first rotating assembly; and
   a second rotating assembly, wherein the first rotating assembly and the second rotating assembly are disposed opposite to each other on two sides of the main shaft;
   wherein the first rotating assembly comprises a first rotating sub-assembly, a first mounting plate, a first magnetic piece, and a first magnetic fitting piece, wherein the first rotating sub-assembly and the first mounting plate are separately rotatably connected to the main shaft, the first rotating sub-assembly comprises a first rotating piece, a rotation axis of the first rotating piece relative to the main shaft is parallel to and does not overlap a rotation axis of the first mounting plate relative to the main shaft, and the first rotating piece is slidably connected to the first mounting plate, and wherein the first magnetic piece is on the first rotating sub-assembly, the first magnetic fitting piece is on the first mounting plate, and the first magnetic piece is configured to magnetically attract and fit the first magnetic fitting piece, wherein a first sliding groove extends in the first mounting plate, and a first slider of the first rotating piece is accommodated in the first sliding groove and is slidable in the first sliding groove to implement slidable connection between the first rotating piece and the first mounting plate, and the first magnetic piece is on the first rotating sub-assembly and spaced from the first sliding groove in a direction that is parallel to an axis of the main shaft;

wherein the second rotating assembly comprises a second rotating sub-assembly, a second mounting plate, a second magnetic piece, and a second magnetic fitting piece, wherein the second rotating sub-assembly comprises a second rotating piece, the second-rotating piece and the second mounting plate are separately rotatably connected to the main shaft, a rotation axis of the second rotating piece relative to the main shaft is parallel to and does not overlap a rotation axis of the second mounting plate relative to the main shaft, and the second rotating piece is slidably connected to the second mounting plate, and wherein the second magnetic piece is disposed on the second rotating sub-assembly, the second magnetic fitting piece is disposed on the second mounting plate, and the second magnetic piece is configured to magnetically attract and fit the second magnetic fitting piece; and wherein the hinge mechanism is configured in a manner that:
   when the first mounting plate slides relative to the first rotating piece in a direction away from the main shaft, and the second mounting plate slides relative to the second rotating piece in a direction away from the main shaft, the first magnetic piece and the first magnetic fitting piece move away from each other and provide a first resistance force for relative sliding between the first rotating piece and the first mounting plate, and the second magnetic piece and the second magnetic fitting piece move away from each other and provide a second resistance force for the second rotating piece and the second mounting plate; or
   when the first mounting plate slides relative to the first rotating piece in a direction towards the main shaft, and the second mounting plate slides relative to the second rotating piece in a direction towards the main shaft, the first magnetic piece and the first magnetic fitting piece magnetically approach each other to drive relative sliding between the first rotating piece and the first mounting plate, and the second magnetic piece and the second magnetic fitting piece magnetically approach each other to drive relative sliding between the second rotating piece and the second mounting plate.

2. The hinge mechanism according to claim 1, wherein both the first magnetic piece and the first magnetic fitting piece are permanent magnets; or the first magnetic piece is a permanent magnet, and the first magnetic fitting piece is an electromagnet; and
   wherein both the second magnetic piece and the second magnetic fitting piece are permanent magnets; or the second magnetic piece is a permanent magnet, and the second magnetic fitting piece is an electromagnet.

3. The hinge mechanism according to claim 1, wherein a first interface of the first magnetic piece is in contact with the first magnetic fitting piece through attraction and fitting, and the hinge mechanism is configured in a manner that, when the first mounting plate slides relative to the first rotating piece, the first magnetic piece and the first magnetic fitting piece move away from or approach each other in a direction parallel to the first interface; and a second interface of the second magnetic piece is in contact with the second magnetic fitting piece through attraction and fitting, and the hinge mechanism is configured in a manner that, when the second mounting plate slides relative to the second rotating piece, the second magnetic piece and the second magnetic fitting piece move away from or approach each other in a direction parallel to the second interface.

4. The hinge mechanism according to claim 1, wherein a first interface of the first magnetic piece is in contact with the first magnetic fitting piece through attraction and fitting, and the hinge mechanism is configured in a manner that, when the first mounting plate slides relative to the first rotating piece, the first magnetic piece and the first magnetic fitting piece move away from or approach each other in a direction perpendicular to the first interface; and a second interface of the second magnetic piece is in contact with the second magnetic fitting piece through attraction and fitting, and the hinge mechanism is configured in a manner that, when the second mounting plate slides relative to the second rotating piece, the second magnetic piece and the second magnetic fitting piece move away from or approach each other in a direction perpendicular to the second interface.

5. The hinge mechanism according to claim 1, wherein:

the first rotating piece comprises a first arc-shaped rotating block and the first slider that are fastened to each other, and the first arc-shaped rotating block is located on a side of the first slider that is closest to the main shaft;

the first magnetic piece is connected to the first slider;

a first arc-shaped guiding groove extends in a side of the main shaft that faces the first rotating piece, and the first arc-shaped rotating block is accommodated in the first arc-shaped guiding groove and is slidable in the first arc-shaped guiding groove to implement rotatable connection between the first rotating piece and the main shaft;

the second rotating piece comprises a second arc-shaped rotating block and a second slider that are fastened to each other, and the second arc-shaped rotating block is located on a side of the second slider that is closest to the main shaft;

the second magnetic piece is connected to the second slider;

a second arc-shaped guiding groove extends in a side of the main shaft that faces the second rotating piece, and the second arc-shaped rotating block is accommodated in the second arc-shaped guiding groove and is slidable in the second arc-shaped guiding groove to implement rotatable connection between the second rotating piece and the main shaft; and wherein a second sliding groove extends in the second mounting plate, and the second slider is accommodated in the second sliding groove and is slidable in the second sliding groove to implement slidable connection between the second rotating piece and the second mounting plate.

6. The hinge mechanism according to claim 5, wherein the hinge mechanism is configured in a manner that, when the first magnetic piece and the first magnetic fitting piece move away from or approach each other in a direction parallel to a contact interface for attraction and fitting, and the second magnetic piece and the second magnetic fitting piece move away from or approach each other in a direction parallel to the contact interface for attraction and fitting, the first magnetic piece is disposed on the first slider, the first magnetic fitting piece is disposed in the first sliding groove, the second magnetic piece is disposed on the second slider, and the second magnetic fitting piece is disposed in the second sliding groove.

7. The hinge mechanism according to claim 5, wherein the hinge mechanism is configured in a manner that, when the first magnetic piece and the first magnetic fitting piece move away from or approach each other in a direction perpendicular to a contact interface for attraction and fitting, and the second magnetic piece and the second magnetic fitting piece move away from or approach each other in a direction perpendicular to the contact interface for attraction and fitting, the first rotating sub-assembly further comprises a first bracket, the first bracket is located on a side of the first mounting plate that faces away from the main shaft, a first end of the first slider that is not a closest end to the first arc-shaped rotating block extends out of the first sliding groove and is fastened to the first bracket, the first magnetic piece is disposed on the first bracket and faces the first mounting plate, the first magnetic fitting piece is disposed on a side of the first mounting plate that faces away from the main shaft, and faces the first magnetic piece, the second rotating sub-assembly further comprises a second bracket, the second bracket is located on a side of the second mounting plate that faces away from the main shaft, a first end of the second slider that is not a closest end to the second arc-shaped rotating block extends out of the second sliding groove and is fastened to the second bracket, the second magnetic piece is disposed on the second bracket and faces the second mounting plate, and the second magnetic fitting piece is disposed on a side of the second mounting plate that faces away from the main shaft, and faces the second magnetic piece.

8. The hinge mechanism according to claim 7, wherein the first bracket and the first rotating piece are an integrated structure, and the second bracket and the second rotating piece are an integrated structure.

9. The hinge mechanism according to claim 5, wherein the first rotating piece and the second rotating piece are centro-symmetrical or axial-symmetrical with respect to the main shaft.

10. An electronic device, comprising:

a flexible display;

a first housing;

a second housing; and a hinge mechanism;

wherein the first housing is fastened to a first mounting plate, the second housing is fastened to a second mounting plate, and the flexible display continuously covers the first housing, the second housing, and the hinge mechanism, and is separately fastened to the first housing and the second housing;

wherein the hinge mechanism comprises a main shaft, a first rotating assembly, and a second rotating assembly, and the first rotating assembly and the second rotating assembly are disposed opposite to each other on two sides of the main shaft;

wherein the first rotating assembly comprises a first rotating sub-assembly, the first mounting plate, a first magnetic piece, and a first magnetic fitting piece, wherein the first rotating sub-assembly and the first mounting plate are separately rotatably connected to the main shaft, the first rotating sub-assembly comprises a first rotating piece, a rotation axis of the first rotating piece relative to the main shaft is parallel to and does not overlap a rotation axis of the first mounting plate relative to the main shaft, and the first rotating piece is slidably connected to the first mounting plate, and wherein the first magnetic piece is disposed on the first rotating sub-assembly, the first magnetic fitting piece is disposed on the first mounting plate, and the first magnetic piece is configured to magnetically attract and fit the first magnetic fitting piece, wherein a first sliding groove extends in the first mounting plate, and a first slider of the first rotating piece is accommodated in the first sliding groove and is slidable in the first sliding groove to implement slidable connection between the first rotating piece and the first mounting plate, and the first magnetic piece is on the first rotating sub-assembly and spaced from the first sliding groove in a direction that is parallel to an axis of the main shaft;

wherein the second rotating assembly comprises a second rotating sub-assembly, the second mounting plate, a second magnetic piece, and a second magnetic fitting piece, wherein the second rotating sub-assembly and the second mounting plate are separately rotatably connected to the main shaft, the second rotating sub-assembly comprises a second rotating piece, a rotation axis of the second rotating piece relative to the main shaft is parallel to and does not overlap a rotation axis of the second mounting plate relative to the main shaft, and the second rotating piece is slidably connected to the second mounting plate, and wherein the second magnetic piece is disposed on the second rotating sub-assembly, the second magnetic fitting piece is disposed on the second mounting plate, and the second magnetic piece is configured to magnetically attract and fit the second magnetic fitting piece; and wherein the hinge mechanism is configured in a manner that:

when the first mounting plate slides relative to the first rotating piece in a direction away from the main shaft, and the second mounting plate slides relative to the second rotating piece in a direction away from the main shaft, the first magnetic piece and the first magnetic fitting piece move away from each other and provide a first resistance force for relative sliding between the first rotating piece and the first mounting plate, and the second magnetic piece and the second magnetic fitting piece move away from each other and provide a second resistance force for the second rotating piece and the second mounting plate; or when the first mounting plate slides relative to the first rotating piece in a direction towards the main shaft, and the second mounting plate slides relative to the second rotating piece in a direction towards the main shaft, the first magnetic piece and the first magnetic fitting piece magnetically approach each other to drive relative sliding between the first rotating piece and the first mounting plate, and the second magnetic piece and the second magnetic fitting piece magnetically approach each other to drive relative sliding between the second rotating piece and the second mounting plate.

11. The electronic device according to claim 10, wherein both the first magnetic piece and the first magnetic fitting piece are permanent magnets; or the first magnetic piece is a permanent magnet, and the first magnetic fitting piece is an electromagnet; and wherein both the second magnetic piece and the second magnetic fitting piece are permanent magnets; or the second magnetic piece is a permanent magnet, and the second magnetic fitting piece is an electromagnet.

12. The electronic device according to claim 10, wherein a first interface of the first magnetic piece is in contact with the first magnetic fitting piece through attraction and fitting, and the hinge mechanism is configured in a manner that, when the first mounting plate slides relative to the first rotating piece, the first magnetic piece and the first magnetic fitting piece move away from or approach each other in a direction parallel to the first interface; and wherein a second interface of the second magnetic piece is in contact with the second magnetic fitting piece through attraction and fitting, and the hinge mechanism is configured in a manner that, when the second mounting plate slides relative to the second rotating piece, the second magnetic piece and the second magnetic fitting piece move away from or approach each other in a direction parallel to the second interface.

13. The electronic device according to claim 10, wherein a first interface of the first magnetic piece is in contact with the first magnetic fitting piece through attraction and fitting, and the hinge mechanism is configured in a manner that, when the first mounting plate slides relative to the first rotating piece, the first magnetic piece and the first magnetic fitting piece move away from or approach each other in a direction perpendicular to the first interface; and wherein a second interface of the second magnetic piece is in contact with the second magnetic fitting piece through attraction and fitting, and the hinge mechanism is configured in a manner that, when the second mounting plate slides relative to the second rotating piece, the second magnetic piece and the second magnetic fitting piece move away from or approach each other in a direction perpendicular to the second interface.

14. The electronic device according to claim 13, wherein the first rotating piece and the second rotating piece are centro-symmetrical or axial-symmetrical with respect to the main shaft.

15. The electronic device according to claim 10, wherein the first rotating piece comprises a first arc-shaped rotating block and the first slider that are fastened to each other, and the first arc-shaped rotating block is located on a side of the first slider that is closest to the main shaft; the first magnetic piece is connected to the first slider; a first arc-shaped guiding groove extends in a side that is of the main shaft and that faces the first rotating piece, and the first arc-shaped rotating block is accommodated in the first arc-shaped guiding groove and is slidable in the first arc-shaped guiding groove to implement rotatable connection between the first rotating piece and the main shaft; and wherein the second rotating piece comprises a second arc-shaped rotating block and a second slider that are fastened to each other, and the second arc-shaped rotating block is located on a side of the second slider that is closest to the main shaft; the second magnetic piece is connected to the second slider; a second arc-shaped guiding groove extends in a side of the main shaft that faces the second rotating piece, and the second arc-shaped rotating block is accommodated in the second arc-shaped guiding groove and is slidable in the second arc-shaped guiding groove to implement rotatable connection between the second rotating piece and the main shaft; and a second sliding groove extends in the second mounting plate, and the second slider is accommodated in the second sliding groove and is slidable in the second sliding groove to implement slidable connection between the second rotating piece and the second mounting plate.

16. The electronic device according to claim 15, wherein the hinge mechanism is configured in a manner that, when the first magnetic piece and the first magnetic fitting piece move away from or approach each other in a direction parallel to a contact interface for attraction and fitting, and the second magnetic piece and the second magnetic fitting piece move away from or approach each other in a direction parallel to the contact interface for attraction and fitting, the first magnetic piece is disposed on the first slider, the first magnetic fitting piece is disposed in the first sliding groove, the second magnetic piece is disposed on the second slider, and the second magnetic fitting piece is disposed in the second sliding groove.

17. The electronic device according to claim 15, wherein the hinge mechanism is configured in a manner that, when the first magnetic piece and the first magnetic fitting piece move away from or approach each other in a direction perpendicular to a contact interface for attraction and fitting, and the second magnetic piece and the second magnetic fitting piece move away from or approach each other in a direction perpendicular to the contact interface for attraction and fitting, the first rotating sub-assembly further comprises a first bracket, the first bracket is located on a side of the first mounting plate that faces away from the main shaft, a first end of the first slider that is not closest to the first arc-shaped rotating block extends out of the first sliding groove and is fastened to the first bracket, the first magnetic piece is disposed on the first bracket and faces the first mounting plate, the first magnetic fitting piece is disposed on a side of the first mounting plate that faces away from the main shaft, and faces the first magnetic piece, the second rotating sub-assembly further comprises a second bracket, the second bracket is located on a side of the second mounting plate that faces away from the main shaft, a first end of the second slider that is not closest to the second arc-shaped rotating block extends out of the second sliding groove and is fastened to the second bracket, the second magnetic piece is disposed on the second bracket and faces the second mounting plate, and the second magnetic fitting piece is disposed on a side of the second mounting plate that faces away from the main shaft, and faces the second magnetic piece.

18. The electronic device according to claim 17, wherein the first bracket and the first rotating piece are an integrated structure, and the second bracket and the second rotating piece are an integrated structure.

* * * * *